United States Patent Office 2,934,533
Patented Apr. 26, 1960

2,934,533

SUBSTITUTED THIOPHENYL PYRIDYL AMINES

Wilhelm Alfons Schuler, Bad Homburg vor der Hohe, and Hans Klebe, Gelnhausen, Germany, assignors to Deutsche Gold- und Silber-Scheideanstalt vormals Roessler, Frankfurt am Main, Germany No Drawing. Application November 8, 1956
Serial No. 621,013

Claims priority, application Germany November 16, 1955

7 Claims. (Cl. 260—243)

The present invention relates to new substituted thiophenyl pyridyl amines derived from thiophenyl pyridyl amines of the general formula

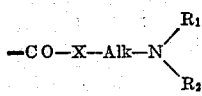

(I)

in which Z represents a benzene nucleus which may be substituted, for example, by halogen, alkyl or alkoxy radicals, or unsubstituted and Y represents a pyridine nucleus which may be substituted, for example, by halogen, alkyl or alkoxy radicals, or unsubstituted and more particularly to such thiophenyl pyridyl amines which are substituted in the 9 position with a radical of the formula

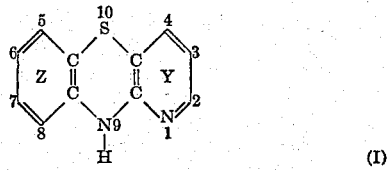

in which X preferably represents an oxygen atom or an —NH— group, but also can be a sulfur atom, Alk represents an alkylene group which can be straight or branch chained, and $R_1$ and $R_2$ are substituted or unsubstituted aliphatic radicals, particularly alkyl radicals. $R_1$ and $R_2$ can also be joined to form a ring, such as, for example, a piperidino or a pyrolidino ring, which in some instances can be interrupted by a hetero atom, such as is the case in the morpholino radical. $R_1$ and/or $R_2$ can also be joined to Alk to form a ring as, for example, is the case when —Alk—N—$R_1R_2$ is a methyl piperidyl radical.

The novel compounds according to the invention can be prepared in a number of ways from the 9 unsubstituted thiophenyl pyridyl amine of formula I. The production of this thiophenyl pyridyl amine is described in co-pending Schuler application S.N. 537,896, filed September 30, 1955. For example, the 9 unsubstituted thiophenyl can be reacted with a carbonic acid dihalide such as, for example, phosgene or bromo phosgene. In some instances it has been found advantageous first to pass a dry stream of hydrogen chloride into the vessel containing the thiophenyl pyridyl amine before the reaction with the halo carbonic acid halide. The resulting thiophenyl pyridyl amino carbonic acid halides of the formula

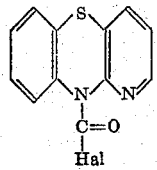

(II)

are then, often expediently without isolation, reacted with an amine of the general formula

in which $R_1$, $R_2$, Alk and X have the same significance as above. This reaction is expediently carried out at elevated temperatures and if desired in the presence of an alkaline condensing agent, for example, potash.

The compounds according to the invention can also be prepared from the thiophenyl pyridyl amino carbonic acid halide of formula II by reaction with a halide of the formula Hal—Alk—X—H, such as ethylene chlorohydrins and then reacting the resulting compound with a secondary amine, such as, for example, dimethyl amine.

According to another method for preparing the compounds according to the invention the carbonic acid dihalide is first reacted with a compound of the formula H—X—Alk—Hal to split off HCl to produce a compound of the formula Hal—CO—X—Alk—Hal and this compound is then reacted with a 9 unsubstituted thiophenyl pyridyl amine of Formula I to split off HCl with the production of a compound of the formula

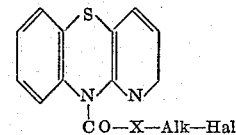

CO—X—Alk—Hal and then reacting this compound with a secondary amine $HNR_1R_2$. The reactions expediently are carried out at elevated temperatures in the presence of agents promoting splitting off of hydrohalides. Also, if desired the reactions can be carried out in the presence of inert organic solvents.

The compounds according to the invention can also be converted into their salts, for example, the hydrochlorides, by conventional procedures.

The compounds according to the invention are useful spasmolytics as they possess an excellent spasmolytic action which is both neurotropic and musculotropic.

The following examples will serve to illustrate several modifications of the invention:

Example 1

15 parts by weight of thiophenyl pyridyl amine were dissolved in a vessel containing 75 parts by weight of chlorobenzene. Dry hydrogen chloride was then blown through the resulting solution for 5 minutes at a bath temperature of 70° C. The bath temperature was then raised to 170° C. and phosgene was blown in for an hour and a half. Thereafter a strong stream of nitrogen was blown in for 10 minutes to displace the phosgene and hydrogen chloride. Then 25 parts by weight of dimethylaminoethanol were introduced into the solution at 100° C. over a several minutes' period and then the solution was boiled under a reflux condenser for 15 minutes. After cooling, water and 30 parts by weight of concentrated HCl were added to the reaction mixture. The chlorobenzene was removed and the aqueous solution rendered alkaline with NaOH, and then shaken out with ether. The ether extract was then dried and the ether driven off. 16.7 parts by weight of the dimethylaminoethyl ester of thiophenyl pyridyl amino carbonic acid were obtained which is 71% of the theoretical yield. This base was then dissolved in isopropanol and a stoichiometric quantity of isopropanolic HCl added (1 mol base:1 mol HCl). The hydrochloride salt precipitated out and after recrystallization it melted at 193–194° C.

Example 2

The procedure of Example 1 was repeated but with the dimethylaminoethanol replaced by N-methylpiperidyl (4). The methylpiperidyl ester of thiophenyl pyridyl carbonic acid was obtained in an 80% yield. This base melted at 151–153° C. and the hydrochloride salt thereof melted at 264–266° C.

Example 3

The following esters of thiophenyl pyridyl amino carbonic acid were produced using the procedure described in Example 1, but replacing the dimethylaminoethanol by the appropriate amino alcohol:

(a) The dimethylaminopropyl ester—M.P. of the free base 92–94° C., M.P. of HCl salt 203–204° C.

(b) The diethylaminoethyl ester—M.P. of HCl salt 187–188° C.

(c) The N-ethylpiperidyl(4) ester—M.P. of free base 159–160° C., M. P. of HCl salt 257–258° C.

(d) The N-n-propyl-piperidyl(4) ester—M.P. of free base 138–140° C., M.P. of HCl salt 235–237° C.

(e) The N-benzyl-piperidyl(4) ester—M.P. of the free base 147–148° C., M.P. of HCl salt 246–247° C.

(f) The piperidino ethyl ester—M.P. of the free base 83–85° C., M.P. of HCl salt 206–207° C.

(g) The piperidino propyl ester—M.P. of the free base 75–77°C., M.P. of the HCl salt 197° C.

(h) The di-isopropylaminoethyl ester—M.P. of the free base 60–63° C., M.P. of the HCl salt 174–176° C.

(i) The morpholino ethyl ester—M.P. of the free base 80–81° C., M.P. of the HCl salt 204–205° C.

(j) The di-n-propylaminoethyl ester—M.P. of the HCl salt 186–189° C.

(k) The di-n-butylaminoethyl ester—M.P. of the HCl salt 140–143° C.

(l) The di-isopropylaminoisopropyl ester—M.P. of the HCl salt 156–158° C.

Example 4

The following thioesters of thiophenyl pyridyl amino carbonic acid were produced using the procedure described in Example 1, but replacing the amino alcohol by the appropriate amino mercaptan:

(a) Using dimethylamino-propylmercaptan, the dimethylaminopropyl thioester—M.P. of the free base 87–89° C., M.P. of the HCl salt 189–191° C.

(b) Using dimethylamino-ethyl-mercaptan, the diethylaminoethyl thioester—M.P. of the free base 94–96° C., M.P. of the HCl salt 194–196° C.

(c) Using di-isopropylamino-ethyl-mercaptan, the di-isopropylaminoethyl thioester—M.P. of the free base 87° C., M.P. of the HCl salt 238° C.

(d) Using dimethylamino-propylmercaptan, the dimethylaminopropyl thioester—M.P. of the free base 87–89° C., M.P. of the HCl salt 189–191° C.

(e) Using di-n-butylaminoethyl mercaptan, the dimethylaminopropyl thioester—M.P. of the HCl salt 156–158° C.

Example 5

15 parts by weight of thiophenyl pyridyl amine were dissolved in 75 parts by weight of chlorobenzene and dry hydrogen chloride blown into the solution at a 170° C. bath temperature. Thereafter, phosgene was blown in for two hours at the same bath temperature and then dry nitrogen was blown in for a further half hour until practically no hydrogen chloride escaped with the nitrogen. After cooling on an ice bath, crystals precipitated which were suction filtered and washed with chlorobenzene. These crystals were then recrystallized from toluene. 12 g. of thiophenyl pyridyl amine carbonic acid chloride with a melting point of 158–160° C. were obtained. Further quantities could be recovered from the mother liquor.

13.1 parts of the thiophenyl pyridyl amino carbonic acid chloride were then dissolved in 6 parts of chloroform and 6.5 parts of γ-diethylamino-propyl amine added thereto. The reaction mixture was then boiled under a reflux condenser for 4 hours and then the chloroform distilled off whereupon the residue crystallized. The yield was 16 parts of N-(thiophenyl pyridyl amine carbonyl)-N',N'-diethylpropyl amino hydrochloride. This salt after recrystallization from isopropanol melted at 144–146° C.

Example 6

The procedure of Example 5 was repeated but replacing the diamine used therein with 1-diethylamino-3-aminopropane and 1-meth yl-piperidyl(4)-methylamine to produce the following compounds:

(a) N(thiophenylpyridylaminocarbonyl)-N',N'-dimethylpropylene diamine—M.P. of the HCl salt 163–164° C.

(b) The thiophenyl pyridyl amino carbonic acid amide of 1-methylpiperidyl-(4)-methyl amine—M.P. of the HCl salt 270–272° C.

Example 7

20 parts of thiophenyl pyridyl amine were dissolved in 80 parts of chlorobenzene. Dry hydrogen chloride was then blown into the resulting solution for 5 minutes at 70° C. The bath temperature was then raised to 170° C. and phosgene was blown in for an hour and a half. Thereafter, a strong stream of nitrogen was blown in for 10 minutes to displace the hydrogen chloride and phosgene. 9 parts of ethylene chlorohydrin were then added and the mixture refluxed for half an hour and thereafter a stream of nitrogen blown in to displace the hydrogen chloride formed. The reaction mixture was then placed in an autoclave and 9 parts of dimethylamine dissolved in a little chlorobenzene were added thereto and the mixture heated in the autoclave for 8 hours at 150° C. After cooling, the contents of the autoclave were filtered and the filtrate shaken out with aqueous hydrochloric acid. After separating off the chlorobenzene, the aqueous phase was rendered alkaline with aqueous NaOH and shaken out with ether. The ether was then dried with potash and then driven off. 20.3 parts of the dimethylaminoethyl ester of thiophenyl pyridyl amino carbonic acid remained as a residue.

The product was then dissolved in isopropanol and neutralized with HCl in isopropanol whereupon the hydrochloride salt precipitated out. After recrystallization it melted at 193–194° C.

Example 8

The procedure of Example 7 was repeated but using 1 chloro-3-oxy propane instead of ethyl chlorohydrin to produce the dimethylaminopropyl ester of thiophenyl pyridyl amino carbonic acid. Its hydrochloride melted at 203–204° C.

Example 9

The procedure of Example 7 was repeated, but morpholine instead of dimethylamine was used to produce the morpholinoethyl ester of thiophenyl pyridyl amino carbonic acid. Its hydrochloric acid salt melted at 204–205° C.

Example 10

The procedure of Example 7 was repeated but using 1 chloro-3-mercapto-propane instead of ethyl chlorohydrin to produce the dimethylaminopropyl thioester of thiophenyl pyridyl amino carbonic acid. Its hydrochloride melted at 189–191° C.

According to experiments as to the therapeutic utility of the new esters, the spasmolytic action of these esters on the isolated intestine of guinea pigs surpasses nearly ten times the spasmolytic effect of papaverine. The same effect was found in comparison with atropine, i.e.

the novel compounds surpass in their spasmolytic action the spasmolytic action of atropine at least to the same degree. Thereby, however, the well known other consequences of a treatment with atropine, for instance, dilatation of the pupil of mice, are less significant.

We claim:

1. A thiophenyl pyridyl amine compound of the formula

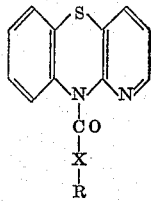

in which X is a member selected from the group consisting of —O—, —S— and —NH— and R is selected from the group consisting of

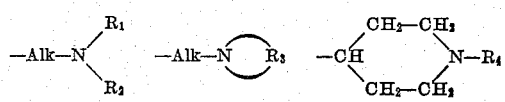

and

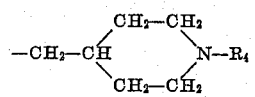

in which —Alk— is a lower alkylene radical, $R_1$ and $R_2$ are lower alkyl radicals,

is a radical selected from the group consisting of piperidino, pyrrolidino and morpholino radicals and $R_4$ is selected from the group consisting of lower alkyl and benzyl radicals.

2. A thiophenyl pyridyl amine compound of the formula

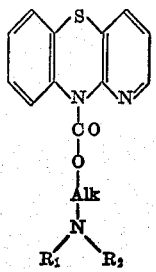

in which Alk is a lower alkylene radical and $R_1$ and $R_2$ are lower alkyl radicals.

3. A thiophenyl pyridyl amine compound of the formula

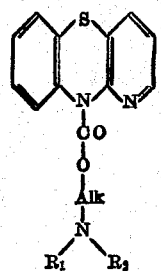

in which Alk is a lower alkylene radical and $R_1$ and $R_2$ are lower alkyl radicals.

4. A thiophenyl pyridyl amine compound of the formula

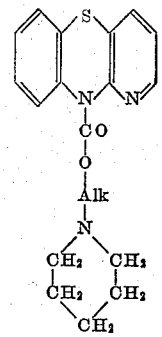

wherein Alk is a lower alkylene radical.

5. A thiophenyl pyridyl amine compound of the formula

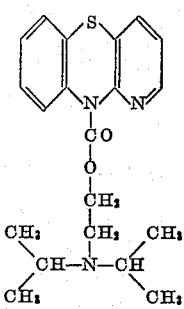

6. A thiophenyl pyridyl amine compound of the formula

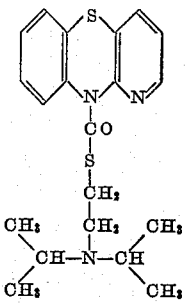

7. A thiophenyl pyridyl amine compound of the formula

References Cited in the file of this patent

UNITED STATES PATENTS 2,789,978    Rath _____ Apr. 23, 1957

FOREIGN PATENTS 514,330    Belgium _____ Oct. 15, 1952